Patented Mar. 27, 1934

1,952,598

UNITED STATES PATENT OFFICE 1,952,598

PRODUCTION OF CONDENSATION PRODUCTS OF UREA AND FORMALDEHYDE

Martin Luther, Mannheim, and Wilhelm Pungs, Robert Griessbach, and Claus Heuck, Ludwigshafen-on-the-Rhine, Germany, assignors to I. G. Farbenindustrie Aktiengesellschaft, Frankfort-on-the-Main, Germany, a corporation of Germany No Drawing. Original application September 8, 1926, Serial No. 134,251. Divided and this application March 27, 1928, Serial No. 265,217. In Germany September 11, 1925

11 Claims. (Cl. 260—3)

The subject-matter of the present application has been divided out from our copending application Ser. No. 134,251, filed September 8th, 1926.

The present process relates to the production of condensation products of urea and formaldehyde.

We have found that in order to obtain valuable, stable products, the condensation should be carried out in an aqueous solution in which a weekly acid reaction corresponding to a concentration of hydrogen ions of pH=4 to 7 is continuously maintained, preferably with the aid of suitable buffer compounds, whereupon the water is removed from the condensation mass to a far going extent while taking care that at least in the latter stage of the evaporation the temperature is not higher than 50° C. It is, however, more suitable to carry out the evaporation throughout below the said temperature. The evaporation can be effected with great advantage by distillation in vacuo. By the said manner of working it is possible to concentrate the sol very strongly without running the risk of a premature formation of a gel, which feature is important for obtaining final products of great stability. The setting or hardening operation is effected at a temperature between about 50 and 100° C., preferably between about 60° and 80° C. Of course, bulky castings require a longer time for hardening than thin coatings prepared with the concentrated, syrupy sol.

The buffer compounds to be employed are single compounds or mixtures which are capable of removing hydrogen ions formed in the reaction and of supplying fresh hydrogen ions in case such are consumed, so that the acidity remains practically unaltered. As very suitable buffer compounds we mention for example mixtures of acetic acid and sodium acetate, of citric acid and sodium citrate, of boric acid and sodium acetate, or potassium bioxalate, mono- or di-sodium phosphate and the like.

Generally from 2 to 3 molecules of formaldehyde will be employed for each molecule of urea. The process is advantageously carried out by causing a warm, concentrated urea solution in which preferably the buffer compounds are dissolved, to run slowly into the formaldehyde solution.

When working with smaller quantities of formaldehyde than indicated above, the risk occurs that the products become opaque during dehydration. In order to overcome this difficulty, it is advantageous to slightly modify the method of working described above by carrying out the condensation in a more acid solution with hydrogen ions corresponding to pH=4 to 6, while effecting the evaporation or dehydration in a weaker acid solution of pH=at least 6 to 7. This can be effected by adding suitable alkaline agents after finishing the condensation and before starting the dehydration. By this manner of working, clear products very stable against the action of water can be obtained with comparatively small quantities of formaldehyde.

We have further found that when working with less than 2 molecules of formaldehyde for each molecule of urea, the evaporation or dehydration may be dispensed with partially or completely and that the condensation product can be separated very rapidly in the form of a liquid colloid insoluble in water by cooling the solution of the condensation product, preferably while adding salts, for which purpose for example, alkali metal salts such as sodium sulfate or chlorid and others are very suitable. Thereby a viscous product is obtained which can be further treated in the known manner, if desired in conjunction with other materials, for example with plasticizers, cellulose esters or ethers and the like. For example the dry product may be pressed to transparent articles of any shape.

When the products are to be employed for the manufacture of lacquers, it is of great advantage to add the solvent to be employed in the lacquer, for example ethylene glycol monomethyl- or mono-ethyl ether or ethylene chlorhydrine, to the mixture before the condensation takes place.

We have further found that condensation products very low in water can be obtained from urea and formaldehyde or their derivatives by adding to the reaction mass a buffer compound or compounds which at the same time reduce swelling such as certain acids or salts, or mixtures thereof. For example, polybasic organic acids or their salts such as citric acid, tartaric acid, citrates, tartrates, or salts of aluminium, or other polyvalent metals, especially those with organic acids may be added. The de-swelling agents are preferably employed in such quantities and mixtures as to obtain a concentration of hydrogen ions suitable for the condensation, so that a further addition of other buffer compounds may be dispensed with.

By this method very stable and uniformly hardening products are obtained which are not subject to strain and to the formation of fissures as often occur with large size articles made of similar condensation products obtained by the methods hitherto known.

Example 1

A warm, concentrated, aqueous solution of 6 parts of pure urea containing 0.11 part of mono-sodium phosphate and 0.04 part of di-sodium phosphate is slowly added to a boiling solution of 25 parts of 30 per cent formaldehyde free from iron. The mixture is evaporated, preferably while employing a vacuum and a temperature below 50° C. from the beginning, until it shows about the consistency of syrup and contains from 10 to 15 per cent of water. The viscous product is stable for a considerable time. For producing for example lenses or other optic articles, the mass is poured into casting-moulds in which it hardens when stored for about 1 to 2 days at 65° C. In case very stable products are required, bulky articles should be stored for a still longer time at elevated temperatures. The resulting mass is clear and is not inclined to shrink or to become opaque or undergo other changes. The mass may also be employed without difficulty for the production of plates, prisms, lenses and the like of large size, which are very elastic and very stable against water.

Example 2

A solution of 120 parts of urea in 80 parts of water to which 20 cubic centimetres of 10 per cent acetic acid and 40 cubic centimetres of a 10 per cent sodium acetate solution have been added as buffer compound, is heated to about 60° C. and slowly added to 400 parts of a boiling 30 per cent formaldehyde solution, while stirring. When the condensation is finished, the clear solution is evaporated, finally in a high vacuum. The resulting colorless mass is hardened as described in Example 1 and yields a clear product stable against the action of water and heat.

Example 3

A solution of 240 parts of urea, 5 grams of chloracetic acid and 10 grams of tri-sodium phosphate in 168 parts of water is stirred into 800 parts of a boiling 30 per cent formaldehyde solution. The clear solution of the condensation product is concentrated in vacuo at 40° C. while stirring and the resulting, clear, viscous mass is further treated as described in Examples 1 and 2.

Example 4

A concentrated aqueous solution of 60 parts of urea and 1 part of mono-sodium phosphate is slowly introduced into a slightly boiling solution of 180 parts of 30 per cent formaldehyde while stirring. After the reaction is finished, 5 parts of di-sodium phosphate are added, the hot liquid is filtered and evaporated in vacuo. The viscous mass may be further treated as described in the above examples. The final products may be immersed in water for any desired time without swelling or undergoing any other changes.

Example 5

540 parts of urea and 1 part of mono-sodium phosphate are dissolved in 400 parts of water. The solution is heated to about 60° to 70° C. and slowly introduced into a boiling solution of 1530 parts of 30 per cent formaldehyde. On cooling, the clear solution separates a viscous condensation product insoluble in water, which is washed with water and dried.

Example 6

3 kilograms of urea, 80 grams of mono-sodium phosphate and 20 grams of di-sodium phosphate are dissolved in 3.5 litres of water and added, while warm, to a slightly boiling mixture of 7 kilograms of 54 per cent paraformaldehyde with 15 litres of ethylene glycol mono-methyl ether. The resulting solution of the condensation product may be employed directly for example as a lacquer. In case additional materials are to be added, it is advantageous to evaporate so much water as to avoid the separation of the additional materials. The quantity of water to be removed depends on the quantity of materials to be added.

Example 7

1200 kilograms of urea and formaldehyde dissolved in 1000 litres of water are condensed with 3750 kilograms of a 32 per cent formaldehyde solution and evaporated in the presence of 4 kilograms of tertiary sodium citrate with an addition of so much of citric acid as to obtain a concentration of the hydrogen ions of for instance pH=4.5.

The use of mixtures of primary and secondary or secondary and tertiary alkali metal citrates has the great advantage that within very wide limits any desired concentration of the hydrogen ions can be obtained and varied during the process.

What we claim is:

1. A process of producing condensation products of urea and formaldehyde which comprises introducing the initial materials into an aqueous weakly acid solution having a pH between 4 and 7 and condensing the initial materials by the application of heat while maintaining the pH continuously throughout the condensation at a constant value between said limits by the employment of a buffer inert to the reacting materials.

2. A process of producing condensation products of urea and formaldehyde which comprises introducing the initial materials into an aqueous weakly acid solution having a pH between 4 and 7, condensing the initial materials by the application of heat while maintaining the pH continuously throughout the condensation at a constant value between said limits by the employment of a buffer inert to the reacting materials and removing water at a temperature not exceeding 50° C.

3. A process of producing condensation products of urea and formaldehyde which comprises introducing the initial materials into an aqueous weakly acid solution having a pH between 4 and 7, condensing the initial materials by the application of heat while maintaining the pH continuously throughout the condensation at a constant value between said limits by the employment of a buffer inert to the reacting materials and removing water at a temperature not exceeding 50° C. by means of distillation in vacuo.

4. A process of producing condensation products of urea and formaldehyde which comprises introducing the initial materials into an aqueous weakly acid solution having a pH between 4 and 7, condensing the initial materials by the application of heat while maintaining the pH continuously throughout the condensation at a constant value between said limits by the employment of a buffer inert to the reacting materials and removing water at a temperature not exceeding 50° C. and hardening the product at between about 50 and about 100° C.

5. A process of producing condensation products of urea and formaldehyde which comprises introducing the initial materials into an aqueous weakly acid solution having a pH between 4 and 6, condensing the initial materials by the application of heat while maintaining the pH continuously throughout the condensation at a constant value between said limits by the employment of a buffer inert to the reacting materials and removing water at a temperature not exceeding 50° C. while maintaining the concentration of the hydrogen ions at least at pH=7.

6. A process of producing condensation products of urea and formaldehyde which comprises introducing the initial materials in the proportions of 1 molecular weight of urea and less than 2 molecular weights of formaldehyde into an aqueous weakly acid solution having a pH between 4 and 6, condensing the initial materials by the application of heat while maintaining the pH continuously throughout the condensation at a constant value between said limits by the employment of a buffer inert to the reacting materials and removing water at a temperature not exceeding 50° C. while maintaining the concentration of the hydrogen ions at least at pH=7.

7. A process of producing condensation products of urea and formaldehyde which comprises introducing the initial materials in the proportion of 1 molecular weight of urea and less than 2 molecular weights of formaldehyde into an aqueous weakly acid solution having a pH between 4 and 7, condensing the initial materials by the application of heat while maintaining the pH continuously throughout the condensation at a constant value between said limits by the employment of a buffer inert to the reacting materials and separating the condensation product by cooling.

8. A process of producing condensation products of urea and formaldehyde which comprises introducing the initial materials in the proportion of 1 molecular weight of urea and less than 2 molecular weights of formaldehyde into an aqueous weakly acid solution having a pH between 4 and 7, condensing the initial materials by the application of heat while maintaining the pH continuously throughout the condensation at a constant value between said limits by the employment of a buffer inert to the reacting materials, separating the condensation product by cooling, drying the product and forming it by pressing.

9. A process of producing condensation products of urea and formaldehyde which comprises introducing the initial materials into an aqueous weakly acid solution having a pH between 4 and 7, condensing the initial materials by the application of heat while maintaining the pH continuously throughout the condensation at a constant value between said limits by the employment of a buffer inert to the reacting materials consisting of a mixture of mono-sodium phosphate and di-sodium phosphate (Example 1).

10. A process of producing condensation products of urea and formaldehyde which comprises introducing the initial materials into an aqueous weakly acid solution having a pH between 4 and 7, condensing the initial materials by the application of heat while maintaining the pH continuously throughout the condensation at a constant value between said limits by the employment of a buffer inert to the reacting materials consisting of a mixture of chloracetic acid and tri-sodium phosphate (Example 3).

11. A process of producing condensation products of urea and formaldehyde which comprises introducing the initial materials into an aqueous weakly acid solution having a pH between 4 and 7, condensing the initial material by the application of heat while maintaining the pH continuously throughout the condensation at a constant value between said limits by the employment of a buffer inert to the reacting materials consisting of a mixture of tri-sodium citrate and citric acid (Example 7).

MARTIN LUTHER.
WILHELM PUNGS.
ROBERT GRIESSBACH.
CLAUS HEUCK.